United States Patent [19]

Hotta et al.

[11] Patent Number: 4,980,677

[45] Date of Patent: Dec. 25, 1990

[54] SATELLITE BUSINESS COMMUNICATION SYSTEM CAPABLE OF MONITORING A PLURALITY OF APERTURE TERMINALS THROUGH A PUBLIC COMMUNICATION NETWORK

[75] Inventors: Toshinori Hotta; Yasunori Yoshizawa, both of Tokyo, Japan

[73] Assignee: NEC Corporation, Japan

[21] Appl. No.: 275,527

[22] Filed: Nov. 22, 1988

[30] Foreign Application Priority Data

Nov. 24, 1987 [JP] Japan .............................. 62-295497
Nov. 24, 1987 [JP] Japan .............................. 62-295498
Dec. 24, 1987 [JP] Japan .............................. 62-328048

[51] Int. Cl.$^5$ .............................................. H04B 1/00
[52] U.S. Cl. ...................... 340/825.060; 340/825.070; 455/12
[58] Field of Search ...................... 340/825.06, 825.07, 340/825.08; 455/9, 12, 13, 56, 57, 53, 54; 370/13, 17, 104.1, 13.1, 75, 93

[56] References Cited

U.S. PATENT DOCUMENTS 3,931,623  1/1976  Sones et al. ........................ 455/12
4,167,730  9/1979  Brown ........................... 340/825.08
4,809,268  2/1989  Tejima et al. ....................... 370/13

FOREIGN PATENT DOCUMENTS 0189823  8/1987  Japan ........................... 370/75

Primary Examiner—Donald J. Yusko
Assistant Examiner—Dervis Magistre
Attorney, Agent, or Firm—Laff, Whitesel, Conte & Saret

[57] ABSTRACT

In a satellite business communication system comprising a plurality of aperture terminals, a supervising station is coupled to the aperture terminals through a public communication network to centralize a monitoring operation of each aperture terminal. Each of the aperture terminals has a terminal directory number and a terminal indentification address while the supervising station has a primary directory number. A monitoring item is transmitting from the supervising station to a selected aperture terminal along with the terminal identification address of the selected aperture terminal and the primary directory number after a transmission path is formed by the terminal directory number through the public communcation network. A result of monitor in the selected aperture terminal is sent as a response signal back to the supervising station through a return path formed by the use of the primary directory number. The result of monitor may be stored in a status memory or be transmitted through a different path to the supervising station, if the return path is busy.

7 Claims, 4 Drawing Sheets

SATELLITE BUSINESS COMMUNICATION SYSTEM CAPABLE OF MONITORING A PLURALITY OF APERTURE TERMINALS THROUGH A PUBLIC COMMUNICATION NETWORK

Background of the Invention:

This invention relates to a satellite business communication system which is used to monitor a plurality of earth stations which are communicable with one another through a satellite and which are located adjacent to customers, such as companies or the like.

Heretofore, proposals have been offered as regards a wide variety of satellite communication systems. At any rate, earth stations which are located on the earth should be monitored in any way about whether or not each earth station carries out a normal operation. For example, a monitoring unit has been located in each of earth stations so as to display a fault or status of each earth station on the monitoring unit. With this structure, such a monitoring unit should be monitored by an operator in each earth station. Alternatively, a monitoring system has been used which comprises a central earth station and a plurality of subsidiary earth stations comprising monitoring units, respectively. In this event, each subsidiary earth station transmits status information thereof from each subsidiary earth station to the central earth station through the satellite by the use of a satellite communication channel and is monitored by an operator in the central earth station.

However, it is to be noted that each of the earth stations, the subsidiary earth stations, and the central earth station becomes expensive so as to carry out the above-mentioned monitoring operation because the monitoring unit should be included in each earth station. This shows that such a monitoring system is useful only when each earth station is large in size and accommodates a large number of customers. In this connection, such an earth station of a large size may be called a usual earth station.

On the other hand, a satellite business communication system has been practically used in companies, communities, or the like. In such a satellite business communication system, it is preferable that each earth station is small in size and inexpensive.

In the meanwhile, such earth stations of a small size must be also monitored or supervised so as to check whether or not each earth station of a small size is normal as well as the usual earth station.

To this end, a monitor and control system has been proposed by Yasuhiro Hoshino et al in NEC Re. & Develop., No. 83, Oct. 1986. The monitor and control system links a plurality of earth stations to a centralized monitor and control station which is remote from the earth stations and which is connected to the earth stations through leased terrestrial telephone circuits. Each of the earth station might be an unmanned or unattended station.

Thus, the monitor and control system should use leased terrestrial telephone circuits and becomes costly for lease charges of the terrestrial telephone circuits. In addition, no description is made at all about communication between the earth stations and the monitor and control station. Accordingly, each of the earth stations might transmit status information in each earth station to the monitor and control station only when the former is accessed by the latter. At any rate, each earth station may passively and periodically transmit status information only in response to an access operation of the monitor and control station. With this structure, no busy state may take place in the monitor and control station.

Moreover, a recent demand is that such a satellite business communication system is exclusively used only in a single company or community and will be referred to as an in-house satellite communication system. In this case, each of earth stations should be very small as compared with that of the above-mentioned satellite business communication system and may be called a very small aperture terminal or an aperture terminal. No consideration is made at all about monitoring and controlling such a very small aperture terminal.

SUMMARY OF THE INVENTION:

It is an object of this invention to provide a satellite business communication system which is capable of monitoring and controlling earth stations, such as very small aperture terminals.

It is another object of this invention to provide a satellite business communication system of the type described, which can monitor the earth stations at very low costs.

It is still another object of this invention to provide a satellite business communication system of the type described, wherein each of the very small aperture terminals can actively transfer a sequence of status information signals to a supervising or monitoring station.

It is yet another object of this invention to provide a satellite business communication system of the type described, which is capable of favorably processing data transfer even when the supervising unit is busy.

A satellite business communication system to which this invention is applicable comprises a plurality of aperture terminals communicable with one another through a satellite and a supervising station for supervising the aperture terminals. Each of the aperture terminals comprises a satellite communication unit coupled to at least one terminator for carrying out satellite communication and to thereby make at least one terminator communicate through the satellite. According to this invention, each of the aperture terminals is monitored through a public communication network by the supervising station. The supervising station comprises central supervising means for supervising the aperture terminals after producing a supervising data signal for supervising the aperture terminals and first data transfer means for transferring the supervising data signal to the public communication network and to receive a response signal through the public communication network and to supply the response signal to the central supervising means. Each of the aperture terminals comprises monitoring means coupled to the satellite communication unit of each of the aperture terminals for monitoring states of the satellite communication in each of the aperture terminals and second data transfer means coupled to the public communication network for transferring the supervising data signal from the public communication network to the monitoring means to make the monitoring means produce a status information signal representative of the states of satellite communication and for transferring the status information signal to the public communication network to make the public communication network deliver the status information signal to the first data transfer means as the response signal.

Figure 1:
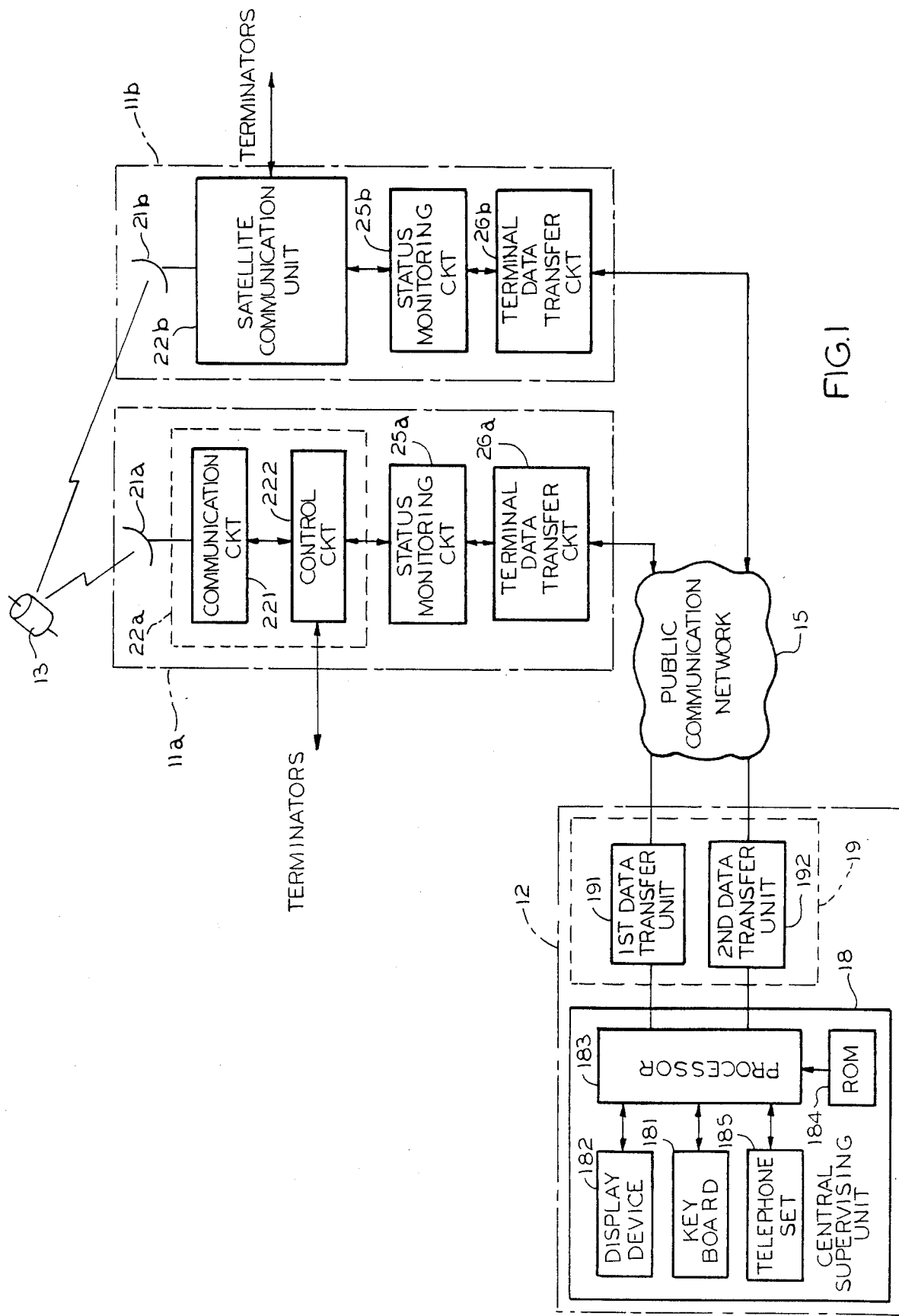
FIG. 1 is a block diagram of a satellite business communication system according to a first embodiment of this invention.

DESCRIPTION OF THE PREFERRED EMBODIMENTS:

Referring to FIG. 1, a satellite business communication system according to a first embodiment of this invention is for use in monitoring first and second earth stations $11a$ and $11b$ by a supervising station 12 which is remote from the first and the second earth stations $11a$ and $11b$ and which serves to centralize a monitoring or supervising operation of the first and the second earth stations $11a$ and $11b$. Each of the first and the second earth stations $11a$ and $11b$ is assumed to be very small in size and may therefore be called very small aperture terminals or aperture terminals simply. Although only two of the aperture terminals are illustrated in FIG. 1, it is needless to say that more than two aperture terminals may be installed in the satellite business communication system. Anyway, each of the first and the second terminals $11a$ and $11b$ is communicable with each other and with another terminal (not shown) through a satellite 13.

As is shown in FIG. 1, the first and the second aperture terminals $11a$ and $11b$ are coupled to the supervising station 12 through a public communication network 15. From this fact, it is readily understood that the first and the second aperture terminals $11a$ and $11b$ are monitored through the public communication network 15 by the supervising station 12. To this end, the supervising station 12 and the first and the second aperture terminals $11a$ and $11b$ have a primary directory number and first and second terminal directory numbers which are preassigned thereto, respectively. In the example being illustrated, first and second primary directory numbers are assumed to be assigned as the primary directory number to the supervising station 12, as will later be described. In addition, the supervising station 12 and the first and the second aperture terminals $11a$ and $11b$ must not be wrongly accessed by any other terminals accommodated in the public communication network 15. Taking this into consideration, a primary identification address is predetermined for the supervising station 12 while first and second terminal identification addresses are preassigned to the first and the second aperture terminals $11a$ and $11b$, respectively.

More specifically, the supervising station 12 comprises a central supervising unit 18 and a first data transfer section 19. The central supervising unit 18 has the primary identification address preassigned thereto and comprises a keyboard 181, a display device 182, a processor 183, a read-only memory 184, and a telephone set 185, each of which will be described. It suffices to say that the central processing unit 18 can be accessed when the primary identification address is received.

On the other hand, the first aperture terminal $11a$ comprises an antenna $21a$ directed towards the satellite 13 and a satellite communication unit $22a$ coupled to one or more terminals, such as personal computers, facsimile devices, and the like. The satellite communication unit $22a$ comprises a communication circuit 221 and a control circuit 222 implemented by a microprocessor. The control circuit 222 controls the communication circuit 221 and is monitored by a status monitoring circuit $25a$. The status monitoring circuit $25a$ produces a status information signal representative of states of the satellite communication or changes of states of the satellite communication. The status information signal may represent an on-state or off-state of a transmission operation in the communication circuit 221, a synchronization or an out-of-synchronization state, an alert state of the communication circuit 221, states of terminators accommodated in the satellite communication unit, and the like. The status information signal is sent from the status monitoring circuit $25a$ to the supervising station 12 through a terminal data transfer circuit $26a$ and the public communication network 15 in a manner to be described later. Herein, it is assumed that the terminal data transfer circuit $26a$ and the status monitoring circuit $25a$ are assigned with the first terminal directory number and the first terminal identification address mentioned above, respectively.

The second aperture terminal $11b$ is similar in structure and operation to the first aperture terminal $11a$ except that the second aperture terminal $11b$ has the second terminal directory number and the second terminal identification number. Accordingly, suffixes "b" are added to components of the second aperture terminal $11b$ corresponding to those of the first aperture terminal $11a$ and description will be omitted about the components of the second aperture terminal $11b$. However, it is to be noted that the second terminal directory number and the second terminal identification address are assigned to the terminal data transfer circuit $26b$ and the status monitoring circuit $25b$, respectively.

In the illustrated central supervising unit 18, the keyboard 181 serves to produce a command signal representative of a command for supervising the first and the second aperture terminals $11a$ and $11b$. In addition, the keyboard 181 is used to indicate monitoring items which are monitored by the supervising station 12. On the other hand, the telephone set 185 serves to produce a selected one of the first and the second terminal directory numbers. The read-only memory 184 is accessed by the selected terminal directory number signal through the processor 183.

The read-only memory 184 has a first memory area for storing the first and the second terminal identification addresses in one-to-one correspondence to the first and the second terminal directory numbers and a second memory area for storing the primary identification address assigned to the central supervising unit 18. Furthermore, the read-only memory 184 has a third memory area for storing the first and the second primary directory numbers assigned to the first and the second data transfer units 191 and 192, respectively.

Now, let the first data transfer unit 191 be seized by the central supervising unit 18 when the telephone set 185 goes off-hook by an operator (not shown) and the first terminal directory number be dialed by the operator. In this event, the first data transfer unit 191 is connected to the first terminal data transfer circuit $26a$ through the public communication network 15 to form a transmission path.

After the transmission path is formed between the first data transfer unit 191 and the terminal data transfer circuit 26a, the central supervising unit 18 transmits the second primary directory number of the second data transfer unit 192, a selected one of the monitoring items, and the first terminal identification address of the status monitoring circuit 25a to the first aperture terminal 11a as the supervising data signal through the transmission path.

In this event, the selected monitoring item is produced from the keyboard 181 while the second primary directory number and the first terminal identification address are read out of the read-only memory 184.

The supervising data signal is received by the terminal data transfer circuit 26a through the public communication network 15 and delivered to the status monitoring circuit 25a through the terminal data transfer circuit 26a. The status monitoring circuit 25a compares the first terminal identification number in the supervising data signal with that assigned to the status monitoring circuit 25a. On detection of coincidence, the second primary directory number and the selected monitoring item are stored in a memory or register included in the status monitoring circuit 22a. The status monitoring circuit 25a monitors the states of the satellite communication in the satellite communication unit 22a in accordance with the selected monitoring item stored in the memory.

Herein, the monitoring items might be determined at every aperture terminal 11a, 11b and might be different from each other at every aperture terminal 11a and 11b. The transmission of each terminal identification address serves to avoid a wrong delivery of the monitoring items. Inasmuch as the status monitoring circuit 25a is not put into an active state as long as the first terminal identification address is not received, even when the terminal data transfer circuit 26a forms a transmission path through the public communication network 15, it is substantially difficult to access the status monitoring circuit 25a from other subscribers than the supervising station.

In the first aperture terminal 11a, the status information signal is derived from the satellite communication unit 22a to be sent from the status monitoring circuit 25a to the terminal data transfer circuit 26a. Under the circumstances, let the status information signal represent the change of the synchronization state to an out-of-synchronization state in the satellite communication unit 22a.

Herein, it is to be noted that the second primary directory number is stored in the memory or register of the status monitoring circuit 25a, as mentioned before. Therefore, the terminal data transfer circuit 26a is supplied with the second primary directory number from the status monitoring circuit 25a and automatically sends the second primary directory number to the public communication network 15. As a result, the terminal data transfer circuit 26a is connected to the second data transfer unit 192 of the supervising station 12 through the public communication network 15.

Under the circumstances, the central supervising unit 18 detects reception of a terminating call at the second data transfer unit 192. Such reception of the terminating call at the second data transfer unit 192 is processed as an interruption request in the central supervising unit 18. Responsive to the interruption request, the central supervising unit 18 produces the command signal which is representative of acceptance of transmission of the status information signal. The command signal is sent from the central supervising unit 18 to the public communication network 15 through the second data transfer unit 192. Specifically, the operator manipulates the keyboard 181 to deliver the command signal to the public communication network 15 through the second data transfer unit 192.

Subsequently, the status information signal is delivered from the status monitoring circuit 25a to the central supervising unit 18 through the terminal data transfer circuit 26a, the public communication network 15, and the second data transfer unit 192. Thus, the status information signal is received as a response signal by the central supervising unit 18 and is displayed on the display device 182. On transmission of the status information signal, the first terminal identification address is also sent from the status monitoring circuit 25a to the central supervising unit 18 through the terminal data transfer circuit 26a and the public communication network 15.

Thus, the central supervising unit 18 can detect changes of states in the satellite communication unit 22a of the first aperture terminal 11a. After the status information signal is given from the first aperture terminal 11a and is wholly collected by the central supervising unit 18, the central supervising unit 18 releases a transmission path between the second data transfer unit 192 and the terminal data transfer circuit 26a and waits for reception of a status information signal sent from the second aperture terminal 11b.

Similar operation is carried out about the second aperture terminal 11b also and will not be described any longer. Thus, the supervising station 12 centralizes the supervising operations of the first and the second aperture terminals 11a and 11b.

In order to favorably carry out the above-mentioned data transfer between the central supervising unit 18 and each of the first and the second aperture terminals 11a and 11b, each of the status monitoring circuits 25a and 25b must be normal in operation. To this end, operation of each status monitoring circuit 25a and 25b is assured in a manner described below.

In this event, it is assumed that the central supervising unit 18 establishes a transmission path between the first data transfer unit 191 and the terminal data transfer circuit 26a in the above-mentioned manner. Under the circumstances, the central supervising unit 18 produces a specific command signal representative of a pseudo-fault state. The specific command signal is transmitted through the transmission path to the status monitoring circuit 25a. Thereafter, the transmission path is released by the central supervising unit 18.

Supplied with the specific command signal, the status monitoring circuit 25a sets, into the memory or register, a pseudo-fault state indicated by the specific command signal. After a predetermined duration of, for example, 10 seconds lapses, the second primary directory number is read out of the memory of the status monitoring circuit 25a to be sent to the terminal data transfer circuit 26a. As a result, the terminal data transfer circuit 26a is connected to the second data transfer unit 192 to establish a transmission path. The status monitoring circuit 25a produces an alert signal indicative of an alert state corresponding to the pseudo-fault state. The alert signal is transmitted to the central supervising unit 18 through the transmission path and the second data transfer unit 192. Responsive to the alert signal, the central supervising unit 18 transmits a release command of releasing the pseudo-fault state to the transmission path and thereafter produces a path release command of releasing the transmission path.

Thus, it is possible to detect whether or not each monitoring circuit is normal by forcibly setting the pseudo-fault state into each status monitoring circuit 25 (suffixes omitted) and by making each status monitoring circuit 25 inform the central supervising unit 18 of occurrence of the pseudo-fault state. In this case, occurrence of the pseudo-fault state is transmitted by accessing the public communication network 15 by each terminal data transfer circuit in the above-mentioned manner. This means that operation of each terminal data transfer circuit can also be assured by the central supervising unit 18.

At any rate, the central supervising unit 12 can centralize the supervising operations of the satellite communication unit 22, the status monitoring circuit 25, and the terminal data transfer circuit 26 (suffixes omitted) of each aperture terminal.

Herein, each of the first and the second aperture terminals 11a and 11b may be formed so that it can autonomously transfer a status information signal to the supervising station 12 on occurrence of a fault in each aperture terminal. In this case, the status information signal is produced each time when states of each aperture terminal are changed from one to another. Under the circumstances, the first and the second aperture terminals 11a and 11b may try to concurrently transfer the status information signals to the supervising station 12 as a result of concurrent occurrence of faults in the first and the second aperture terminals 11a and 11b. In this event, a selected one of the first and the second aperture terminals 11a and 11b is alone connected to the supervising station 12 and is allowed to transfer the status information signal of the selected aperture terminal. This means that the status information signal of the remaining aperture terminal is not transferred to the supervising station 12 and might be extinct or disappear in the remaining aperture terminal.

Figure 2:
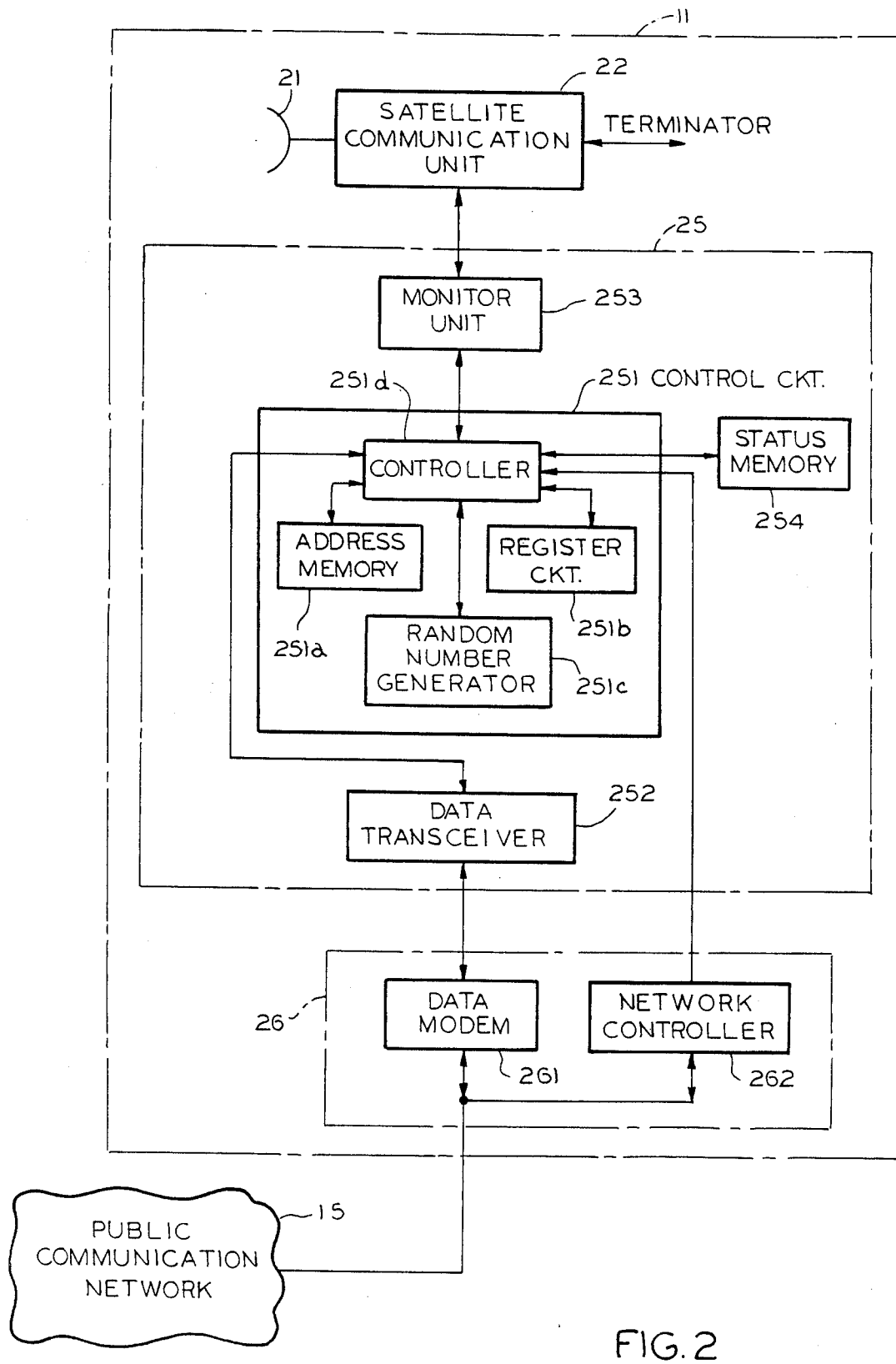
FIG. 2 is a block diagram of an aperture terminal for use in a satellite business communication system according to a second embodiment of this invention.

Referring to FIG. 2, an aperture terminal 11 (suffixes omitted) is for use in a satellite business communication system according to a second embodiment of this invention. The aperture terminal 11 serves to hold a status information signal therein when the supervising station 12 (FIG. 1) is put into a busy state on transmission of the status information signal from the aperture terminal 11. Accordingly, the status information signal remains in the aperture terminal 11 until it is transferred to the supervising station 12.

More particularly, the illustrated aperture terminal 11 comprises an antenna 21, a satellite communication unit 22 coupled to the antenna 21, a status monitoring circuit 25, and a terminal data transfer circuit 26 coupled to the public communication network 15, like in FIG. 1. In FIG. 2, the terminal data transfer circuit 26 comprises a data modem 261 and a network controller 262 while the status monitoring circuit 25 comprises a control circuit 251 coupled to the network controller 262, a data transceiver 252 coupled to the data modem 261, a monitor unit 253 for monitoring the satellite communication unit 22 under control of the control circuit 251, and a status memory 254 coupled to the control circuit 251. The control circuit 251 comprises an address memory 251a for memorizing an address preassigned to the aperture terminal 11, a register circuit 251b for storing each monitoring item, a random number generator 251c, and a controller 251d. The register circuit may be referred to as an item memory for storing each monitoring item. At any rate, the control circuit 25a enables various operations necessary for the status monitoring circuit 25.

Let each of the monitoring items be transferred from the supervising station 12 to the aperture terminal 11 in a manner similar to that mentioned in conjunction with FIG. 1. It is assumed that the illustrated aperture terminal 11 is the first aperture terminal 11a shown in FIG. 1 and that the first terminal directory number, the second primary directory number, each of the monitoring items, and the first terminal identification address are sent as the supervising data signal from the central supervising unit 18 to the aperture terminal 11. In this event, the first terminal directory number and the first terminal identification address are assigned to the terminal data transfer circuit 26 (FIG. 2) and the status monitoring circuit 25 (FIG. 2), respectively, while the second primary terminal directory number is assigned to the second data transfer unit 192 (FIG. 1).

In the aperture terminal 11, the network controller 262 detects a ringing signal resulting from the first terminal directory number and supply the control circuit 251 with a detection signal indicative of detection of the ringing signal. Responsive to the detection signal, the control circuit 251 supplies the network controller 262 with a connection command indicative of connection of a transmission path to make the network controller 262 establish the transmission path.

Under the circumstances, the first terminal identification address is sent to the control circuit 251 through the data modem 261 and the data transceiver 252 and is collated with an address preassigned to an address memory of the control circuit 251. When the first terminal identification address is coincident with the preassigned address, each of the monitoring items is set into the register circuit of the control circuit 251, along with the second primary directory number. Thus, an initial set operation is completed.

Subsequently, the controller of the control circuit 251 delivers each monitoring item from the register circuit to the monitor unit 253. As a result, the monitor unit 253 carries out operations indicated by each monitoring item to monitor states of the satellite communication unit 22.

When the monitor unit 253 detects changes of the states by detecting occurrence of faults in the satellite communication unit 22 and produces the status information signal indicative of the changes of states, the status information signal is stored in the status memory 254 through the control circuit 251. The control circuit 251 controls the network controller 262 so as to transmit the second primary directory number to the public communication network 15 through the network controller 262.

Herein, it is surmised that alert states are concurrently detected as the changes of the states in the first and the second aperture terminals 11a and 11b (FIG. 1) and that the second primary directory number is simultaneously sent from the first and the second aperture terminals 11a and 11b. In this case, only one of the aperture terminals can call or access the supervising station 12 while the other fails to access the supervising station 12.

When the access to the supervising station 12 is succeeded in a selected one of the aperture terminals, the supervising station 12 is operated in the manner illustrated in FIG. 1. Specifically, the second data transfer unit 192 detects the terminating call to supply the central supervising unit 18 with the interruption signal. Responsive to the interruption signal, the central supervising unit 18 delivers an allowance command of allowing transmission of the status information signal to the public communication network 15 through the second data transfer unit 192. The allowance command is sent to the control circuit 251 through the data modem 261 and the data transceiver 252. Thus, the aperture terminal 11 detects reception of the access to the supervising station 12.

Thereafter, the status information signal which is given from the monitor unit 253 is produced by the control circuit 251 together with the first terminal identification address assigned to the aperture terminal 11 and is sent as the response signal to the central supervising unit 18 through the data transceiver 252, the data modem 261, the public communication network 15, and the second data transfer unit 192. Thus, the central supervising unit 18 collects the status information signal through a transmission path to judge the changes of the states in the aperture terminal 11. Thereafter, the transmission path is released by sending a completion command from the central supervising unit 18 and by receiving the completion command in the control circuit 251.

On the other hand, let the second data transfer unit 192 be put into a busy state when the supervising station 12 (FIG. 1) is accessed by the aperture terminal 11 (FIG. 2). In this case, a busy tone is detected by the network controller 262 and sent to the control circuit 251. The control circuit 251 thus knows failure of the access to the supervising station 12 and releases the public communication network 15 by controlling the network controller 262. The network controller 262 stops an originating connection operation therein under control of the control circuit 251.

Subsequently, the random number generator is energized in the control circuit 251 to produce a random number. The controller measures an interval of time determined by the random number and controls the network controller 262 after lapse of the interval of time. As a result, the network controller 262 again starts the originating connection operation which may be called a reconnection operation. The interval of time is thus determined by the random number and is variable at random at every one of the aperture terminals.

Accordingly, the illustrated aperture terminal 11 has a low probability of conflicts among reconnection operations in the other aperture terminals after any faults simultaneously take place in the aperture terminals.

On the reconnection operation, the status information signal is read out of the status memory 254 to be sent to the supervising station 12.

When a following change of the states is detected within the interval of time, the following change of the states is also memorized as the status information signals in the status memory 254 under control of the control circuit 251. This shows that the status information signals are successively memorized in the status memory 254 and are successively sent to the supervising station 12 in the above-mentioned manner.

At any rate, even on occurrence of a transient fault, such as an interruption of a baseband signal given from the terminators accommodated in the aperture terminal 11, any status information signal related to the transient fault is not extinct from the aperture terminal 11.

Figure 3:
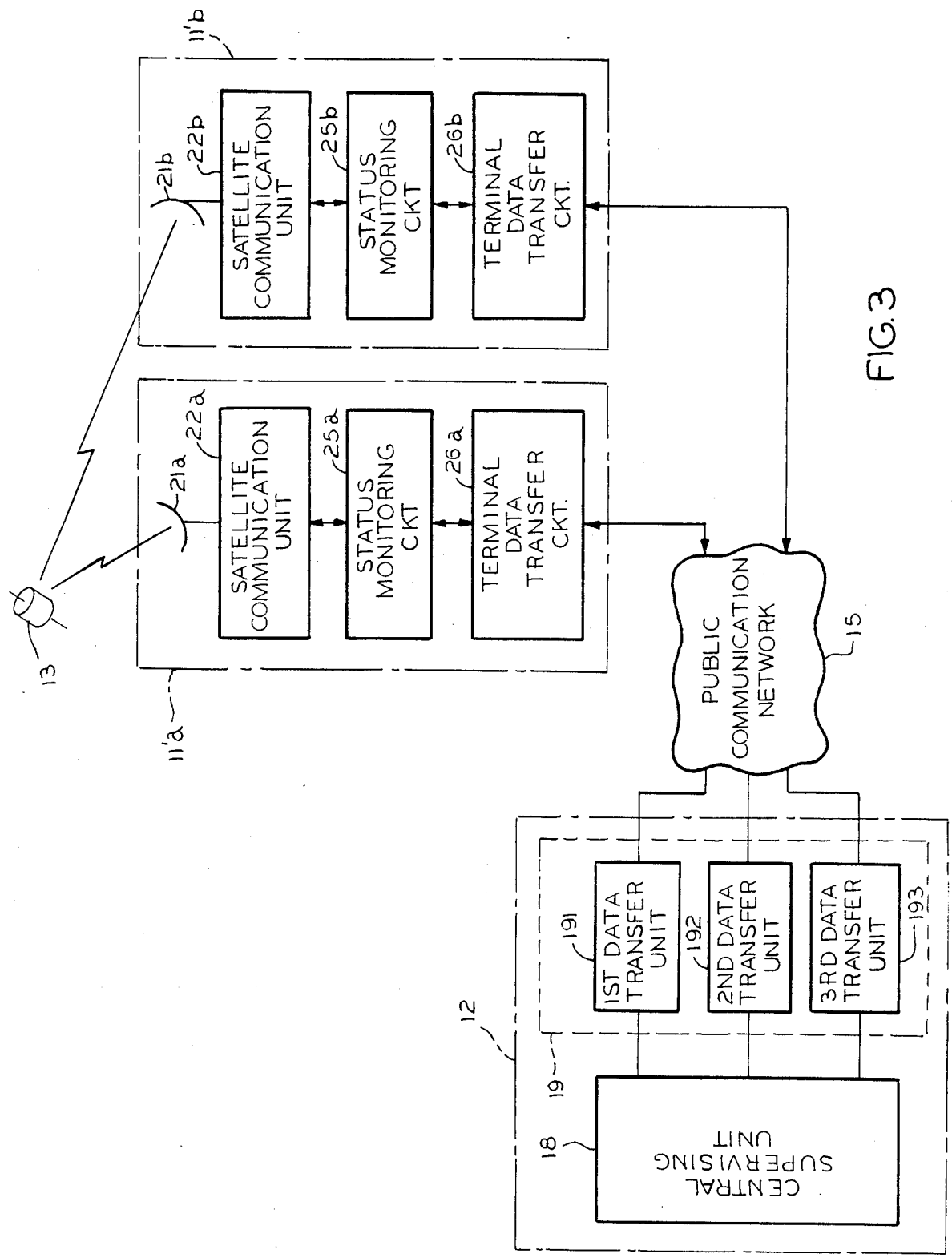
FIG. 3 is a block diagram of a satellite business communication system according to a third embodiment of this invention.

Referring to FIG. 3, a satellite business communication system according to a third embodiment of this invention comprises similar parts designated by like reference numerals. The illustrated supervising station 12 is similar in structure and operation to that illustrated in FIG. 1 except that a third data transfer unit 193 is included in the transfer section 19 in addition to the first and the second data transfer units 191 and 192. The third data transfer unit 193 has a third primary directory number (depicted at #3) which is preassigned thereto and which is different from the first and the second primary directory numbers (depicted at #1 and #2). In addition, the third data transfer unit 193 is operable in a manner similar to the second data transfer unit 192 and serves to receive or collect the response signals sent from each of first and second aperture terminals 11'a and 11'b, like the second data transfer unit 192. This shows that the first data transfer unit 191 is operable to deliver the supervising data signal to each of the first and the second aperture terminals 11'a and 11'b like in FIG. 1.

It is to be noted that the second data transfer unit 192 has a degree of priority higher than that of the third data transfer unit 193 and is therefore preferentially accessed by each of the first and the second aperture terminals 11'a and 11'b before the third data transfer unit 193 is accessed.

The supervising station 12 is coupled through the public communication network 15 to the first and the second aperture terminals 11'a and 11'b which are similar in structure to each other and which comprises antennas 21a and 21b, satellite communication units 22a and 22b, status monitoring circuits 25a and 25b, and terminal data transfer circuits 26a and 26b, respectively, like in FIG. 1.

Figure 4:
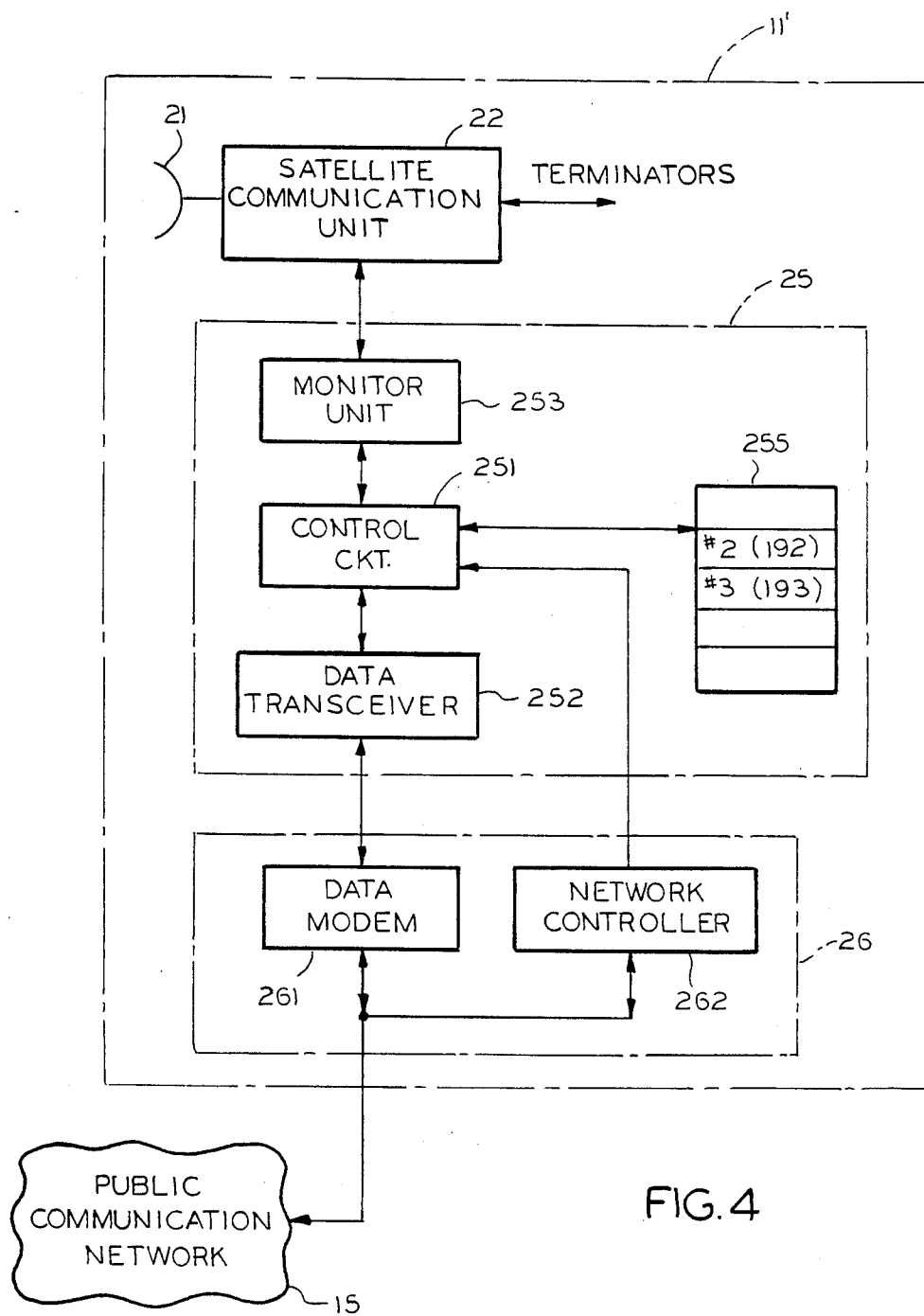
FIG. 4 is a block diagram of an aperture terminal for use in the satellite business communication system illustrated in FIG. 3.

Referring to FIG. 4 together with FIG. 3, an aperture terminal 11' (suffixes omitted) is used as each of the first and the second aperture terminals 11'a and 11'b and is similar to that illustrated in FIG. 2 except that a directory memory 255 is included in the status monitoring circuit 25 instead of the status memory 254 (FIG. 2).

In FIGS. 3 and 4, an initial set operation is at first carried out to transmit the supervising data signal from the supervising station 12 to each of the first and the second aperture terminals 11'a and 11'b. The initial set operation is similar to that illustrated in FIGS. 1 and 2 except that both the second and the third primary directory numbers (#2 and #3) are transmitted as the supervising data signal together with a selected one of the first and the second terminal directory numbers, each of the monitoring items, and a selected one of the first and the second terminal identification addresses. The second and the third primary directory numbers (#2 and #3) are produced from the supervising station 12 after a transmission path is formed between the first data transfer unit 191 and a selected one of the first and the second aperture terminals 11'a and 11'b that may be assumed to be the aperture terminal 11' illustrated in FIG. 4. Such a transmission path is formed in the manner described in conjunction with FIGS. 1 and 2. Therefore, no description will be made about formation of the transmission path.

Anyway, the second and the third primary directory numbers (#2 and #3) are sent during the initial set operation to the directory memory 255 through the data modem 261 and the data transceiver 252 under control of the control circuit 251.

Thereafter, the aperture terminal 11' reads the second primary directory number (#2) out of the directory memory 255 to connect the terminal data transfer circuit 26 to the first data transfer unit 191 through the public communication network 15 each time when any faults take place in the form of the status information signal in the aperture terminal 11'. The network controller 262 connects the data modem 261 to the second data transfer unit 192 through the public communication unit 15 by the use of the second primary directory number as long as no concurrent faults occur in the first and the second aperture terminals 11'a and 11'b. Thereafter, operation is carried out in the manner described in FIG. 2 and will not therefore be described.

On the other hand, let the first and the second aperture terminals 11'a and 11'b (FIG. 3) simultaneously transfer the status information signals to the supervising station 12 due to concurrent occurrence of any faults in the first and the second aperture terminals 11'a and 11'b. In this event, both the first and the second aperture terminals 11'a and 11'b try to access the second data transfer unit 192 of the supervising station 12 by the use of the second primary directory number (#2). Under the circumstances, a selected one of the first and the second aperture terminals 191 and 192 alone can practically access the second data transfer unit 192 while the remaining one of the first and the second aperture terminals 11'a and 11'b fails to access the second data transfer unit 192.

As regards the selected aperture terminal accessible to the second data transfer unit 192, operation is carried out in the above-mentioned manner and will not be described any longer.

As regards the remaining aperture terminal which is not accessible to the second data transfer unit 192, a busy tone is detected by the network controller 262 (FIG. 4) to be sent to the control circuit 251. After detection of the busy tone, the network controller 262 stops an originating connection operation under control of the control circuit 251 and releases the public communication network 15. Subsequently, the control circuit 251 reads the third primary directory number (#3) out of the directory memory 255 to send the same to the network controller 262. As a result, the third data transfer unit 193 (FIG. 3) is accessed to be connected to the data modem 261 through the public communication network 15. Thus, the status information signal can be transmitted from the control circuit 251 to the central supervising unit 18 through the third data transfer unit 193 and collected as the response signal by the central supervising unit 18. After collection of the status information signal, the third data transfer unit 193 is released by the central supervising unit 18 to finish operations for monitoring the aperture terminal 11' in question.

In the example being illustrated in FIGS. 3 and 4, the second and the third data transfer units 192 and 193 are included in the supervising station 12 in correspondence to the aperture terminals. In other words, the data transfer units, such as 192 and 193, are equal in number to the aperture terminals. However, the number of the data transfer units for receiving the response signals may not always be equal to that of the aperture terminals.

With this structure, it is possible to quickly collect the status information signals without a substantial waiting time even when faults concurrently occur in a plurality of the aperture terminals 11'. This means that a transient fault, such as a momentary interruption, can rapidly be transmitted with a real time, although a status information signal related to the transient fault is liable to disappear when a waiting time is present. In addition, a status memory may be included in the status monitoring circuit 25 (FIG. 4) like in FIG. 3.

It is possible to assure a normal operation of each aperture terminal by setting a pseudo-fault information signal into each aperture terminal in a manner mentioned in conjunction with FIG. 1.

While this invention has thus far been described in conjunction with a few embodiments thereof, it will readily be possible for those skilled in the art to put this invention into practice in various other manners. For example, the supervising station 12 may carry out additional operation in addition to the monitoring operation by sending any other commands from the supervising station to a selected one of the aperture terminals. Such additional operations may be carried out, for example, to change transmission and reception radio channels assigned to each aperture terminal. In addition, reliability and secrecy of a monitoring operation can be improved by adding a password to each of the supervising data signal and the response signal and/or by scrambling them. In FIG. 1, the supervising station 12 may comprise a single data transfer unit which transmits the supervising data signal and receives the response signal. Although the initial set operations are carried out by transmitting various kinds of the numbers and the addresses from the supervising station to each aperture terminal through the public communication network, such numbers and addresses may be manually set in each aperture terminal.

What is claimed is:

1. In a satellite business communication system comprising a plurality of aperture terminals communicable with one another through a satellite and a supervising station for supervising said aperture terminals, each of said aperture terminals comprising a satellite communication unit coupled to at least one terminator for carrying out satellite communication and to thereby make said at least one terminator communicate through said satellite, the improvement wherein:
 each of said aperture terminals is monitored through a public communication network by said supervising station;
 said supervising station comprising:
 central supervising means for supervising said aperture terminals after producing a supervising data signal for supervising said aperture terminals; and
 first data transfer means for transferring said supervising data signal to said public communication network and to receive a response signal through said public communication network and to supply said response signal to said central supervising means;
 each of said aperture terminals comprising:
 monitoring means coupled to the satellite communication unit of each of said aperture terminals for monitoring states of said satellite communication in each of said aperture terminals; and
 second data transfer means coupled to said public communication network for transferring said supervising data signal from said public communication network to said monitoring means to make said monitoring means produce a status information signal representative of said states of satellite communication and for transferring said status information signal to said public communication network to make said public communication network deliver said status information signal to said first data transfer means as said response signal.

2. A satellite business communication system as claimed in claim 1, wherein said central supervising means produces, as said supervising data signal, a pseudo-fault data signal for putting each of said aperture terminals into a pseudo-fault state;
said monitoring means being supplied with said pseudo-fault data signal to put said satellite communication unit into said pseudo-fault state and to make the same produce an alert signal;
said alert signal being transferred as said response signal to said central supervising means through said second data transfer means and said public communication network.

3. A satellite business communication system as claimed in claim 1, wherein said first data transfer means has a first preassigned directory number while said second data transfer means has each of terminal preassigned directory numbers;
said central supervising means comprising:
means for producing a command signal representative of a command for supervising said aperture terminals;
means for producing a terminal directory number signal representative of each of the terminal preassigned directory numbers;
means for producing a station directory number signal representative of said first preassigned directory number; and
means for supplying said first data transfer means with said command signal, said terminal directory number signal, and said station directory number signal as said supervising data signal;
each of said aperture terminals comprising register means for storing said station directory number signal;
said second data transfer means comrpising:
accessing means coupled to said register means for accessing said public communication network to connect said first data transfer means through said public communication network by the use of said station directory number signal read out of said register means.

4. A satellite business communication system as claimed in claim 1, wherein said first data transfer means comprises:
first and second data transfer units having first and second primary directory numbers different from one another for receiving said response signal from each of said aperture terminals;
said monitoring means comprising:
memory means for storing said first and said second primary directory numbers; and
control means coupled to said memory means for controlling said memory means to selectively send said status information signal to a selected one of said first and said second data transfer units through said second data transfer means as said response signal by selecting said first and said second primary directory numbers stored in said memory means.

5. A satellite business communication system as claimed in claim 4, wherein said second data transfer means comprises:
detecting means for detecting whether or not said first data transfer means is busy through said public communication network before transfer of said response signal;
said first and said second data transfer units having first priority and second priority lower than said first priority, respectively;
said control means reading said second primary directory number out of said memory means only when said detecting means detects that said first data transfer unit is busy and, otherwise, reading said first primary directory number.

6. A satellite business communication system as claimed in claim 1, wherein said second data transfer means comprising:
detecting means for detecting whether or not said first data transfer means is put into a busy state before transfer said status information signal to produce a detection signal representative of detection of said busy state;
said monitoring means comprises:
storage means for storing said status information signal; and
control means coupled to said detecting means for controlling said storage means to make said storage means store said status information signal in response to said detection signal and to read the status information signal out of said storage means again after lapse of a variable time.

7. A satellite business communication system as claimed in claim 6, wherein said control means includes:
generating means for generating a random number to determine said variable time and;
means coupled to said generating means for accessing said storage means to read said status information signal out of said storage means after lapse of said variable time.

* * * * *